L. T. RASMUSSEN.
INTERNAL COMBUSTION ENGINE.
APPLICATION FILED APR. 29, 1909.
959,805.
Patented May 31, 1910.
4 SHEETS—SHEET 1.
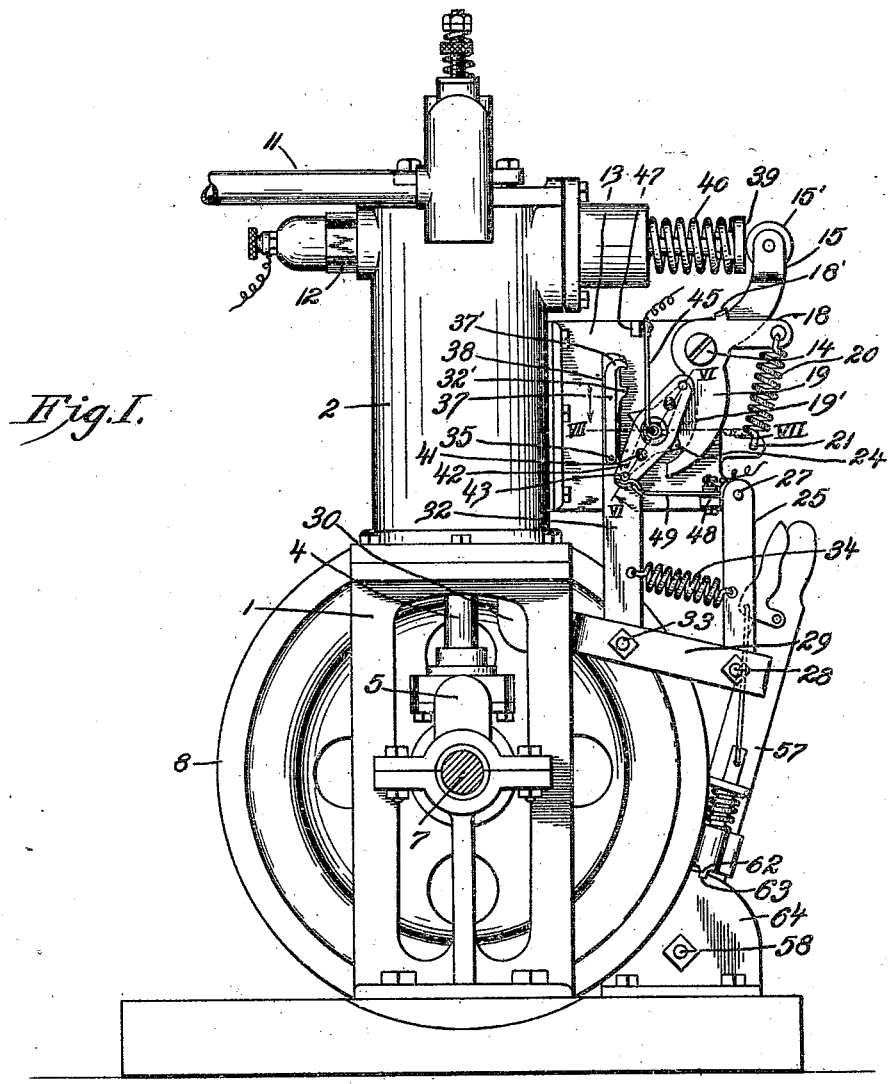
Fig. I.
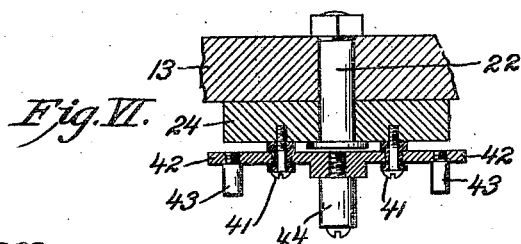
Fig. VI.
Witnesses.
E. A. Cahill
Myrtle M. Jackson
Inventor,
Laurits T. Rasmussen.
By Arthur C. Brown
Attorney.

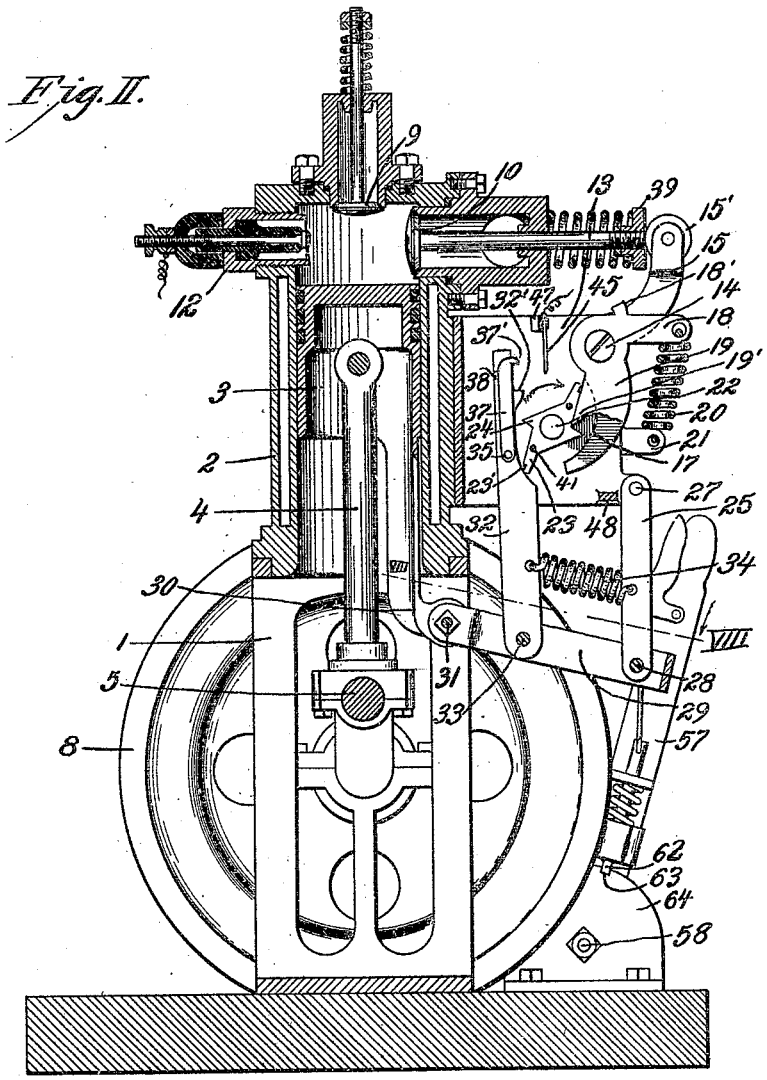

L. T. RASMUSSEN.
INTERNAL COMBUSTION ENGINE.
APPLICATION FILED APR. 29, 1909.
959,805.
Patented May 31, 1910.
4 SHEETS—SHEET 3.
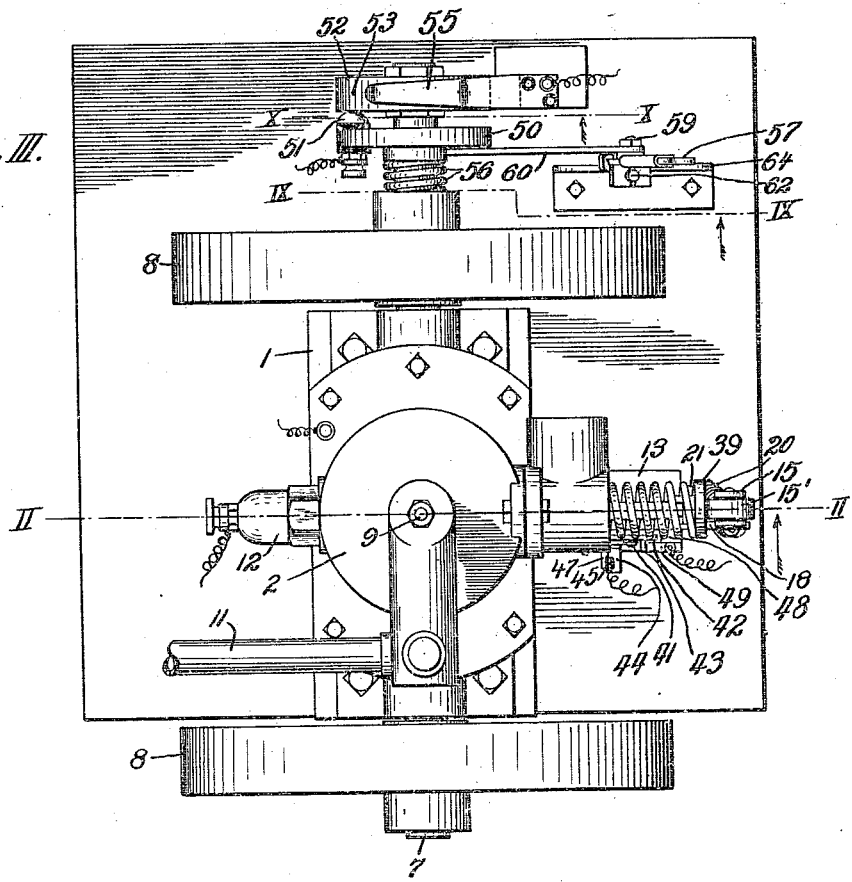
Witnesses.
Inventor.
Laurits T. Rasmussen.
By Arthur C. Brown
Attorney.

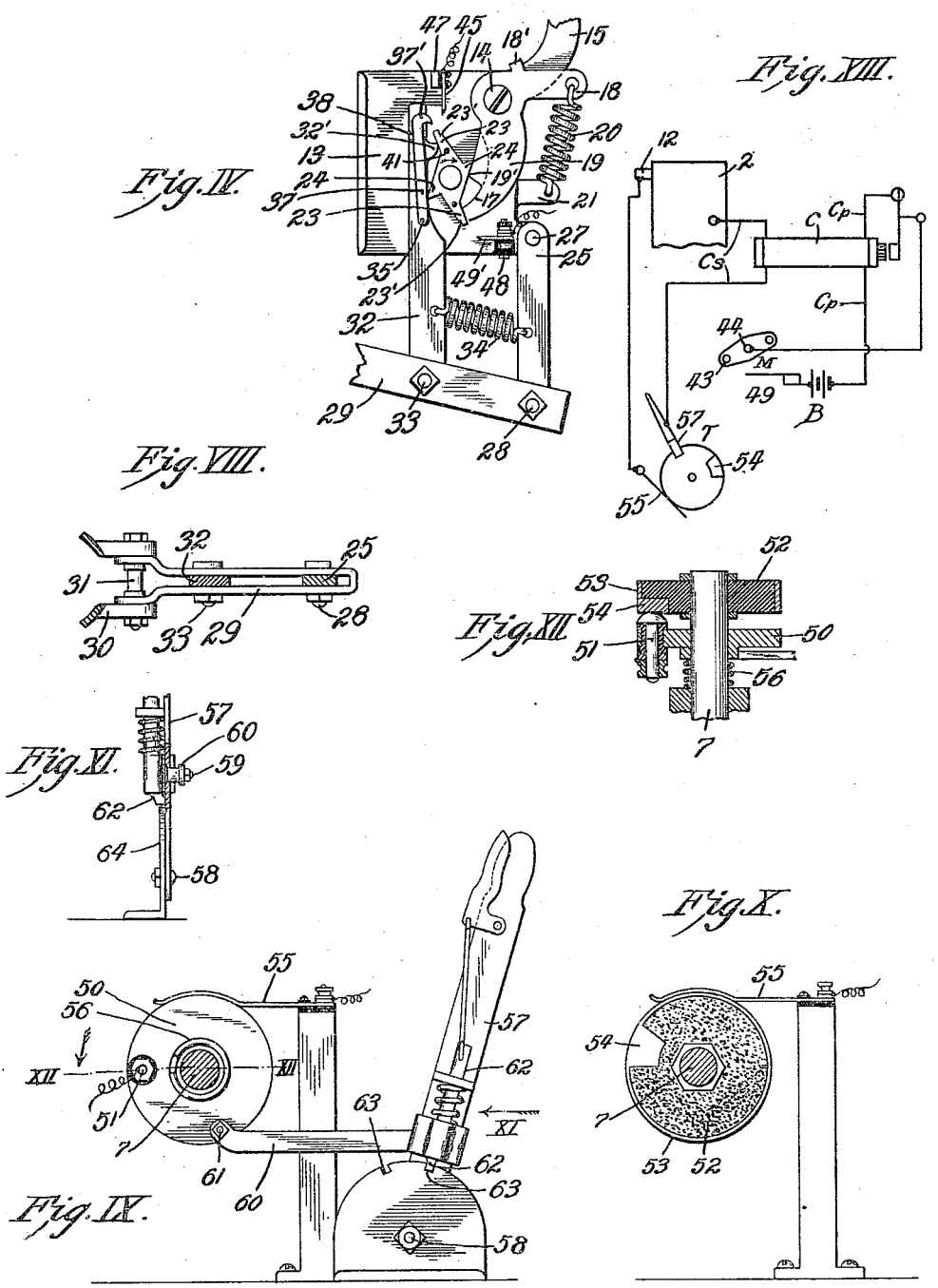

UNITED STATES PATENT OFFICE.

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION OF SOUTH DAKOTA.

INTERNAL-COMBUSTION ENGINE.

959,805. Specification of Letters Patent. Patented May 31, 1910.

Application filed April 29, 1909. Serial No. 492,834.

*To all whom it may concern:*

Be it known that I, LAURITS T. RASMUSSEN, a citizen of the United States, residing at Council Bluffs, in the county of Pottawatamie and State of Iowa, have invented certain new and useful Improvements in Internal-Combustion Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to internal combustion engines.

The objects of the invention are to provide, in four-stroke cycle reversible engines, an exhaust valve gear that shall operate equally well when running in either direction; to provide, in engines of the kind referred to, an ignition mechanism that shall operate equally as well when running in either direction; and to provide simple means for reversing the direction of rotation of the engine shaft.

My invention consists in the improved details of structure which will herein be fully described and pointed out in the claims, reference being had to the accompanying drawings, in which like reference characters refer to like parts throughout the several views and in which;—

Figure I is an end elevation of an engine constructed in accordance with my invention. Fig. II is a vertical section, taken on line II—II of Fig. III, the valve gear in elevation, minus the make and break device. Fig. III is a plan view of the engine. Fig. IV is a detail view of parts of the exhaust valve gear. Fig. V is a plan view of the same, partly broken away. Fig. VI is a detail section taken on line VI of Fig. I. Fig. VII is a detail section taken on line VII of Fig. I. Fig. VIII is a detail section taken on line VIII of Fig. II. Fig. IX is a sectional elevation of the engine reversing gear, taken on line IX—IX of Fig. III. Fig. X is a sectional detail of same, taken on line X—X of Fig. III. Fig. XI is a detail of the reversing lever, viewed in direction of arrow XI, Fig. IX. Fig. XII is a sectional detail taken on line XII—XII of Fig. IX. Fig. XIII is a circuit diagram of connections for the ignition governing devices.

The usual and well-known parts of the engine will first be designated.

1 is the frame; 2 is the cylinder; 3 is the piston therein; 4 is the connecting rod; 5 is the crank and 7 the shaft; 8 the flywheels; 9 is the admission valve; 10 is the exhaust valve; 11 is the fuel feed pipe; 12 is the spark plug.

13 is an upright plate bolted to the cylinder 2 for supporting the exhaust valve gear and the ignition make-and-break gear.

Mounted on a stud 14, fixed on plate 13, is the exhaust valve opening lever 15. This lever extends below the fulcrum 14 and is formed with a concave cam surface 17, (see Fig. II). Mounted on the same stud 14 is a lever 18—19 whose function will hereafter appear. Its depending part is pressed inwardly by a spring 20, attached to a fixed lug 21. A portion of this lever 19 is broken away in order to expose more of the cam surface 17.

Mounted rotatably on a stud 22 is a four-tooth ratchet 23—24, provided with diametrically opposite long teeth 23 and with diametrically opposite short teeth 24. It is turned in the direction of the arrow. Its long teeth 23 are adapted to engage the cam surface 17 of lever 15 and thereby rock said lever and open the valve 10, also holding the valve open during the proper interval. The ratchet 23—24 is as thick as the combined thickness of levers 15 and 18—19, so that its teeth will act upon lever 15 and will be acted upon by lever 18—19. The outer arm 19 is formed with a short surface 19', adapted to engage each of the ratchet teeth as hereinafter described.

The ratchet 23—24 is actuated by the following mechanism: An arm 25 is pivoted on a stud 27, and carries, at its free end, a pivot 28, on which is fulcrumed a rock-lever 29. The piston 3 is provided with an extension arm 30, projecting outside of the cylinder and pivotally connected at 31 to the rock-lever 29. The driving pawl arm 32 is pivotally connected to lever 29 at 33 and is drawn toward the ratchet 23—24 by a spring 34, shown as connected to arm 25. On the pawl arm 32 is a shoulder 32', adapted to engage each of the four ratchet teeth 23, 24 successively during the up strokes of the pawl arm. It will be clear that the ratchet will not be rotated as far by engagement of its shorter teeth as by that of its longer teeth. Four up and down strokes of the piston will cause the ratchet to perform exactly one revolution. Each of the longer teeth 23 is formed near its end with a slight recess, notch or indentation, 23'. Pivotally mounted on pawl-arm 32, at 35, is an arm 37 having a hooked end or hook 37', adapted to engage the notch 23' of either tooth 23 during the engagement of said tooth by the driving shoulder 32'. The rearward motion of arm 37 is limited by a stop 38 on arm 32. The lever 18—19, urged by spring 20, can be drawn only as far by said spring as is permitted by a projection 18' of arm 18 that engages the valve opening lever 15.

The operation of the exhaust valve is as follows: Regardless of the direction in which the engine may be running, the pawl-arm 32 will be reciprocated vertically by the motion of the piston. During the compression stroke the shoulder 32' will engage one of the short ratchet teeth 24 and will turn the ratchet to the position shown in Fig. I. This movement will move the lever 15 very slightly or not at all. To permit a slight motion thereof, the roller 15' may be normally a little out of contact with valve stem head 39. During the power stroke the pawl-arm 32 descends, and at the beginning of the exhaust stroke the hook arm 37 rides upon the long ratchet tooth 23 before the driving shoulder engages said tooth. When this occurs the ratchet is turned through an angle exceeding 90 degrees. This causes the tooth 23 opposite the driven tooth to engage the surface 17 of lever 15 and turn said lever on its pivot thereby opening the exhaust valve 10, also holding the latter open for the desired interval. Some engine builders close the exhaust exactly at dead center, while others prefer to close it after dead center. When the ratchet tooth passes off the tail of lever 15, the valve-closer spring 40 closes the valve.

The spring-pressed lever 18—19 holds the ratchet against movement between strokes by engaging the short teeth 24 as shown in Fig. I, and by engaging the long teeth as shown in Fig. II, the tension of the spring longer teeth 23 is formed near its end with a 20 effecting this result.

It will be understood that the exhaust valve will be opened at every fourth stroke of the piston by the means described. Toward the end of each exhaust stroke, the hook 37' disengages itself from the recess 23' in tooth 23, and the action of lever 18—19 on the ratchet turns the latter a little farther before its motion is arrested. The hook 37 prevents the closing of the exhaust valve before the cycle is completed.

Rigidly mounted on the ratchet 23—24 by screws 41, but insulated therefrom by bushings, is a double arm 42, carrying contact pins 43, diametrically opposite. A metal stud 44 is electrically connected with the center of arm 42 and is contacted by a brush 45 fixed on an insulated lug 47 on plate 13. Secured to a second insulated lug 48 is a make-and-break spring 49, adapted for wiping contact with pins 43. At the end of every other up stroke of the piston (or at the end of every compression stroke) one of the pins 43 will strike the contact member 49 and close the circuit and will remain in contact therewith until the ratchet is again turned.

The circuit leads through the spark plug 12 in the usual way, and through a timing device which has the function of "reversing" the engine at will of the operator. This device is illustrated in Figs. IX to XII, inclusive, also in plan in Fig. III. As shown in Fig. III, it comprises a rockable member 50, mounted loosely on the engine shaft (though it may be placed on a separately driven shaft), an insulated contact member 51 carried by member 50, means for rocking said member, a wheel 52, fixed upon that shaft and provided with a peripheral metal ring 53 and with a segmental metal surface 54 on its inner face, and a continuous connection to the ring 53 through a brush 55. The body of wheel 52 is insulating material. The contact maker 51 is adapted to be contacted by the revolving segment 54, once during each revolution, and during the time when ignition should occur in the cylinder. Disk 50 is pressed toward wheel 52 by a spring 56.

Any suitable means for adjusting the timer disk 50 may be employed. I have shown a lever 57, fulcrumed at 58 and connected at 59 to a link 60, connected at 61 to the disk 50. Lever 57 has a latch 62, engaging either of two or more notches 63 in a plate 64. These notches represent the opposite directions in which the engine may be run. The wheel 52 is so adjusted on the engine shaft that when the lever latch takes into one of the notches the engine will run in one direction, and when the latch takes into the other notch the engine will reverse its running. This will be readily understood without a technical description. It is also obvious that the spark may be advanced or retarded by further adjustment of the lever 57.

Operative connections may be made by placing the timer and the spark plug in series with the "secondary" of an induction coil, and placing the make-and-break members 44, 49 in series with a battery and the "primary" of the coil. Such an arrangement is shown diagrammatically in Fig. XIII. 2 indicates the engine cylinder; 12, the spark plug; T, the timer comprising parts 51 and 54; C, an induction coil having secondary wires C$^s$ and primary wires C$^p$; B, a battery; M, the make - and - break device comprising the members 43 and 49. The operation has already been described. A modification would consist in transposing the timer circuit and the make - and - break circuit. In either case, a circuit will be closed between 51 and 54 at every revolution of the engine, and a circuit will be closed between 43 and 49 at every other revolution. One of the circuit closers will operate in series with the sparking plug, and one induction winding; the other, in series with battery and the other induction winding.

It is evident that if the engine is always to be run in the same direction the timer T or 51—54 may be cut out.

Where mechanically opened admission valve is desired, such valve may be operated by a duplicate of the mechanism shown in Fig. II.

Having thus described my invention, what I claim as new therein and desire to secure by Letters-Patent is:—

1. In a four-stroke cycle internal combustion engine, having a valve, the combination of a valve-opening lever, a ratchet having two opposite teeth adapted to actuate said lever, and having shorter intermediate teeth, and a reciprocating member actuated by a moving part of the engine for driving said ratchet by alternate engagement with longer and shorter teeth.

2. In a four-stroke cycle internal combustion engine, having a valve, the combination of a piston extension, a rock lever actuated thereby, a pawl-arm actuated by the rock-lever, a ratchet actuated by the pawl-arm, a spring drawing the pawl-arm toward the ratchet, said ratchet comprising alternate longer and shorter teeth, and a valve-opening lever arranged to be actuated by the longer teeth of the ratchet.

3. In a four-stroke cycle internal combustion engine, having a valve, the combination of a valve-opening lever, a ratchet having alternate longer and shorter teeth, the longer teeth being adapted to actuate said lever, a reciprocating member actuating the ratchet by engaging each tooth thereof, and means preventing the closure of said valve before the close of a cycle.

4. In a four-stroke cycle internal combustion engine, having a valve, the combination of a valve-opening lever, a ratchet having alternate longer and shorter teeth, the longer teeth being adapted to actuate said lever, a reciprocating member actuating the ratchet by engaging each tooth thereof, and a hook-arm pivotally mounted on the reciprocating member and adapted to retard the movement of the ratchet, for the purpose set forth.

5. In an internal combustion engine, having a valve, the combination of a valve lever, a lever located adjacent to the valve lever and having a lug adapted for engagement therewith, a ratchet adapted for engagement with both of said levers, a spring for returning the second lever after its ratchet engagement, and means, connected with the engine piston, for actuating said ratchet.

In testimony whereof I affix my signature in presence of two witnesses.

LAURITS T. RASMUSSEN.

Witnesses:
  G. F. SPOONER,
  W. I. WALKER.